(12) United States Patent
Zhu et al.

(10) Patent No.: US 10,410,023 B2
(45) Date of Patent: Sep. 10, 2019

(54) NON-CONTACT COMMUNICATION DEVICE, NON-CONTACT COMMUNICATION METHOD, AND NON-CONTACT COMMUNICATION SYSTEM

(71) Applicant: SONY CORPORATION, Tokyo (JP)

(72) Inventors: Yan Zhu, Kanagawa (JP); Shino Ogasahara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/559,370

(22) PCT Filed: Mar. 11, 2016

(86) PCT No.: PCT/JP2016/057736
§ 371 (c)(1),
(2) Date: Sep. 18, 2017

(87) PCT Pub. No.: WO2016/152576
PCT Pub. Date: Sep. 29, 2016

(65) Prior Publication Data
US 2018/0075265 A1    Mar. 15, 2018

(30) Foreign Application Priority Data

Mar. 25, 2015 (JP) ................................. 2015-061954

(51) Int. Cl.
*H04B 5/02* (2006.01)
*H04B 5/00* (2006.01)
(Continued)

(52) U.S. Cl.
CPC ..... *G06K 7/10297* (2013.01); *G06K 19/0723* (2013.01); *H04B 5/0031* (2013.01); *H04B 5/02* (2013.01)

(58) Field of Classification Search
CPC ....................................................... H04W 4/80
See application file for complete search history.

(56) References Cited

U.S. PATENT DOCUMENTS

2008/0061945 A1    3/2008 Hoshina
2008/0074263 A1*   3/2008 Rofougaran ......... G06K 7/0008
                                                340/572.1
(Continued)

FOREIGN PATENT DOCUMENTS

CN      101145203 A    3/2008
JP      2000-332518 A  11/2000
(Continued)

OTHER PUBLICATIONS

International Search Report and Written Opinion of PCT Application No. PCT/JP2016/057736, dated Apr. 12, 2016,11 pages of ISRWO.

*Primary Examiner* — Wen W Huang
(74) *Attorney, Agent, or Firm* — Chip Law Group

(57) ABSTRACT

The present technology relates to a non-contact communication device, a non-contact communication method, a program, and a non-contact communication system capable of achieving a simpler configuration to implement an active side function. A non-contact communication device includes a communication unit that receives a command from a first device using a carrier wave output from the first device and sends a command to a second device using the carrier wave output from the first device. The present technology can be used in a non-contact communication device or the like.

10 Claims, 8 Drawing Sheets

(51) Int. Cl.
    *G06K 7/10*           (2006.01)
    *G06K 19/07*        (2006.01)

(56) References Cited

U.S. PATENT DOCUMENTS

| | | | | |
|---|---|---|---|---|
| 2011/0241837 A1* | 10/2011 | Suzuki | ............... | G06K 7/0008 340/10.1 |
| 2013/0210360 A1* | 8/2013 | Ljung | ............... | H04W 4/80 455/41.2 |
| 2014/0035727 A1* | 2/2014 | Nguyen | ............... | H04W 4/008 340/10.1 |
| 2014/0213188 A1* | 7/2014 | Kim | ............... | H04W 4/80 455/41.2 |
| 2014/0254470 A1* | 9/2014 | Wendling | ............... | H04L 69/08 370/315 |
| 2015/0163724 A1* | 6/2015 | Tanabe | ............... | H04W 48/08 455/41.1 |
| 2015/0263789 A1* | 9/2015 | Buchsbaum | ......... | H04B 1/3816 455/41.1 |
| 2016/0071089 A1* | 3/2016 | Boivie | ............... | G06Q 20/3278 705/73 |
| 2016/0366540 A1* | 12/2016 | Teruyama | ............ | H04B 5/0031 |

FOREIGN PATENT DOCUMENTS

| | | |
|---|---|---|
| JP | 2008-97585 A | 4/2008 |
| JP | 2009-193155 A | 8/2009 |

\* cited by examiner

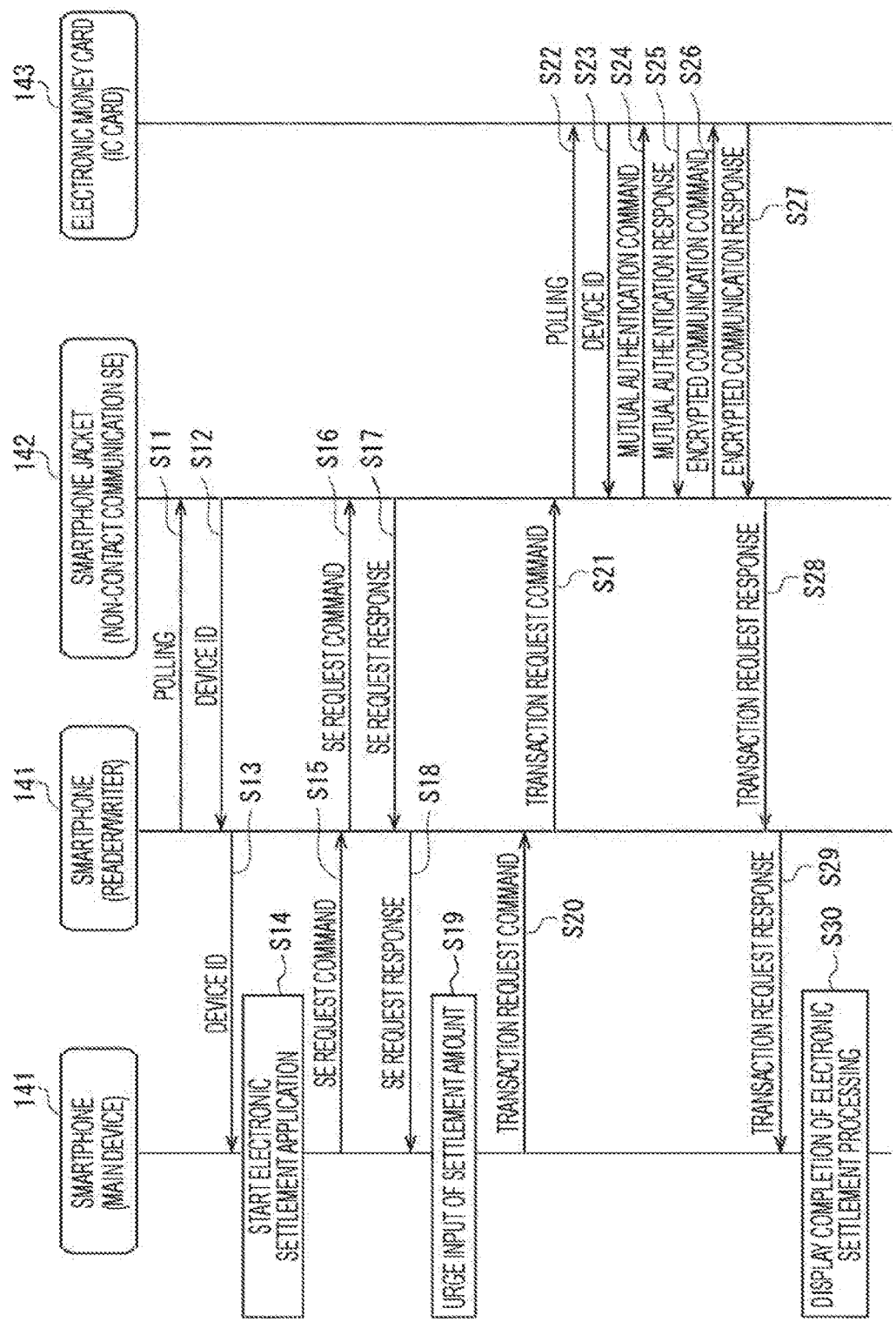

FIG. 8

| TYPE | ADVANTAGES | DISADVANTAGES |
|---|---|---|
| MULTIFUNCTIONAL DEDICATED TERMINAL | OFFLINE SETTLEMENT<br>- FAST PROCESSING SPEED<br>- LESS SITUATIONAL RESTRICTIONS<br>- EASY PROCESSING ON SERVER SIDE | DEDICATED TERMINAL<br>- HIGH TERMINAL COST<br>- DIFFICULT TO ADD NEW FUNCTION |
| THIN CLIENT TERMINAL | VERSATILE TERMINAL<br>- LOW TERMINAL COST<br>- EASY TO ADD NEW FUNCTION | ONLINE SETTLEMENT<br>- UNSTABLE PROCESSING SPEED, SUSCEPTIBLE TO COMMUNICATION STATE<br>- AVAILABLE ONLY IN SITUATIONS WITH NETWORK ENVIRONMENT<br>- COMPLICATED PROCESSING ON SERVER SIDE |

NON-CONTACT COMMUNICATION DEVICE, NON-CONTACT COMMUNICATION METHOD, AND NON-CONTACT COMMUNICATION SYSTEM

CROSS REFERENCE TO RELATED APPLICATIONS

This application is a U.S. National Phase of International Patent Application No. PCT/JP2016/057736 filed on Mar. 11, 2016, which claims priority benefit of Japanese Patent Application No. JP 2015-061954 filed in the Japan Patent Office on Mar. 25, 2015. Each of the above-referenced applications is hereby incorporated herein by reference in its entirety.

TECHNICAL FIELD

The present technology relates to a non-contact communication device, a non-contact communication method, a program, and a non-contact communication system. In particular, the present technology relates to a non-contact communication device, a non-contact communication method, a program, and a non-contact communication system capable of achieving a simpler configuration to implement an active side function.

BACKGROUND ART

A non-contact integrated circuit (IC) card is used as, for example, an electronic money card, a transport pass, or a card for room entry management. Such an IC card can record large volume data and encrypt data, and is also excellent in terms of security, when compared to other types of card, such as a magnetic card.

A non-contact communication device that carries out near-field non-contact wireless communication includes a device operating as an active side that outputs an electromagnetic wave from the device and modulates the electromagnetic wave to send a command to an opponent device, and a passive side that carries out load modulation of the electromagnetic wave output from the opponent device to respond to the command.

A communication method for carrying out communication in an IC card processing system including three non-contact IC cards, in which the non-contact IC cards have both passive side and active side functions, and the non-contact IC card operating as the passive side switches to the active side during the communication has been proposed (see Patent Document 1).

CITATION LIST

Patent Document

Patent Document 1: Japanese Patent Application Laid-Open No. 2014-63341

SUMMARY OF THE INVENTION

Problems to be Solved by the Invention

The non-contact IC card used in the method disclosed in Patent Document 1, however, requires all elements needed for both passive side and active side functions, thus complicating the configuration of the device and leading to an increase of the manufacturing cost.

The present technology has been made in view of the above situations, and it is an object to achieve a simpler configuration to implement an active side function.

Solutions to Problems

In a first aspect of the present technology, a non-contact communication device includes a communication unit that receives a command from a first device using a carrier wave output from the first device, and sends a command to a second device using the carrier wave output from the first device.

In the first aspect of the present technology, a non-contact communication method includes receiving, by a non-contact communication device, a command from a first device using a carrier wave output from the first device, and sending, by the non-contact communication device, a command to a second device using the carrier wave output from the first device.

In the first aspect of the present technology, a program causes a computer to execute non-contact communication processing including receiving a command from a first device using a carrier wave output from the first device, and sending a command to a second device using the carrier wave output from the first device.

In the first aspect of the present technology, the command from the first device is received using the carrier wave output from the first device, and the command is sent to the second device using the carrier wave output from the first device.

In a second aspect of the present technology, a non-contact communication system includes a reader/writer and a non-contact communication device, the reader/writer outputting a carrier wave to send a command to the non-contact communication device, the non-contact communication device receiving the command from the reader/writer using the carrier wave output from the reader/writer and sending a command to another non-contact communication device using the carrier wave output from the reader/writer.

In the second aspect of the present technology, a reader/writer and a non-contact communication device are provided. The reader/writer outputs a carrier wave to send a command to the non-contact communication device. The non-contact communication device uses the carrier wave output from the reader/writer to receive the command from the reader/writer, and uses the carrier wave output from the reader/writer to send the command to another non-contact communication device.

It is noted that the program can be provided by transferring the program via a transmission medium or recording the program in a recording medium.

The non-contact communication device may be provided as an independent device, an IC chip, a module, or an internal block of a single device.

Effects of the Invention

According to the first and second aspects of the present technology, a simpler configuration can be achieved to implement an active side function.

It is noted that the effects listed herein are not always limited, and one effect among the effects disclosed herein may be provided.

BRIEF DESCRIPTION OF DRAWINGS

FIG. 7 is a flowchart for explaining the electronic money settlement processing.

FIG. 8 is a diagram illustrating typical classifications of a reader/writer terminal.

MODE FOR CARRYING OUT THE INVENTION

Modes for carrying out the present technology (hereinafter referred to as embodiments) will be described below. It is noted that the description is given in the following order:

1. Description of Communication Method in Near-field Non-contact Communication
2. Embodiment of Communication System According to the Present Technology
3. Example of Use of Application in the Communication System According to the Present Technology <1. Description of Communication Method in Near-Field Non-Contact Communication>

Figure 1:
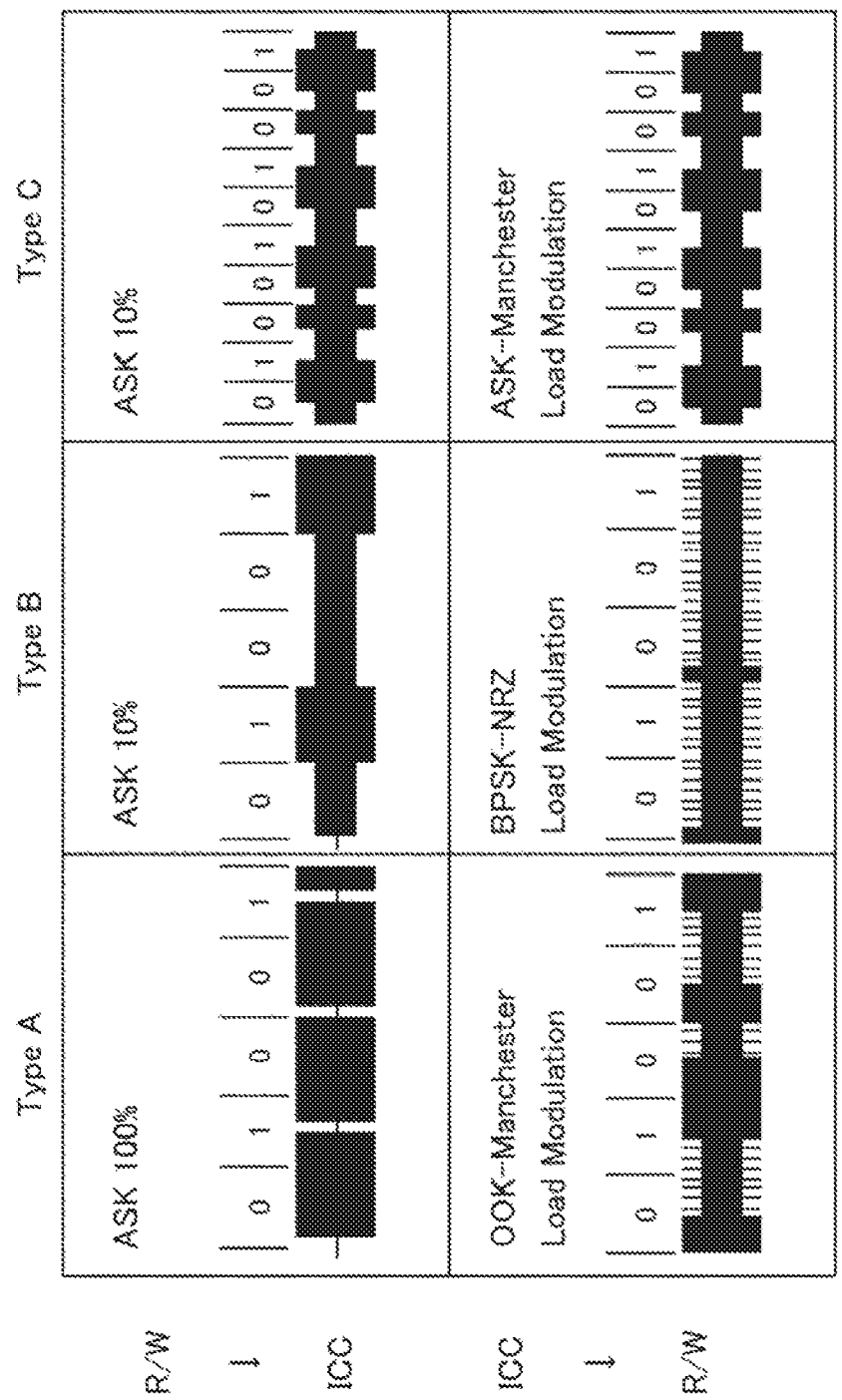
FIG. 1 is a diagram for explaining types of communication method for near-field non-contact communication.

First, by referring to FIG. 1, types of communication method in near-field non-contact communication for carrying out near-field non-contact wireless communication are briefly described.

There are various types of communication method for near-field non-contact communication, including, for example, those called type A, type B, and type C communication methods, as illustrated in FIG. 1.

Type A is adopted in MIFARE (registered trademark) system from Philips (currently NXP Semiconductors N.V.). Type A adopts, as a modulation method, amplitude-shift-keying (ASK) 100% modulation of a carrier wave in transmission from a reader/writer to an IC card, while using an on-off-keying modulation (OOK) of a sub-carrier wave in transmission from an IC card to a reader/writer. As an encoding method, Miller encoding of data is carried out in transmission from a reader/writer to an IC card, while Manchester encoding of data is carried out in transmission from an IC card to a reader/writer. Type A adopts a data communication rate of, for example, 106 kilobits per second (kbps).

Type B adopts, as a modulation method, the ASK 10% modulation of the carrier wave in transmission from the reader/writer to the IC card, and binary phase shift keying (BPSK) modulation of the sub-carrier wave in transmission from the IC card to the reader/writer. As the encoding method, NRZ-L encoding of data is carried out in transmission from the reader/writer to the IC card, and NRZ encoding of data is carried out in transmission from the IC card to the reader/writer. Type B adopts a data communication rate of, for example, 106 kbps.

Type C is adopted in, for example, FeliCa (registered trademark) system from Sony Corporation who is the applicant of the present invention. Type C adopts, as a modulation method, the ASK 10% modulation of the carrier wave in transmission from the reader/writer to the IC card, and ASK 10% modulation of the carrier wave in transmission from the IC card to the reader/writer. As the encoding method, Manchester encoding of data is carried out in both transmission from the reader/writer to the IC card and transmission from the IC card to the reader/writer. Type C adopts a data communication rate of, for example, 212 kbps.

Thus, type A and type B are asymmetrical communication in which the modulation method and the encoding method are different between the transmission from the reader/writer to the IC card and the transmission from the IC card to the reader/writer. In contrast, type C is symmetrical communication in which the modulation method and the encoding method are the same in the transmission from the reader/writer to the IC card and the transmission from the IC card to the reader/writer.

In the type C communication method, which is symmetrical communication, a command signal from the reader/writer to the IC card can be distinguished from a response signal from the IC card to the reader/writer by changing data located at a predetermined position of packet data transmitted and received between the reader/writer and the IC card to be different for command data and response data.

Figure 2:
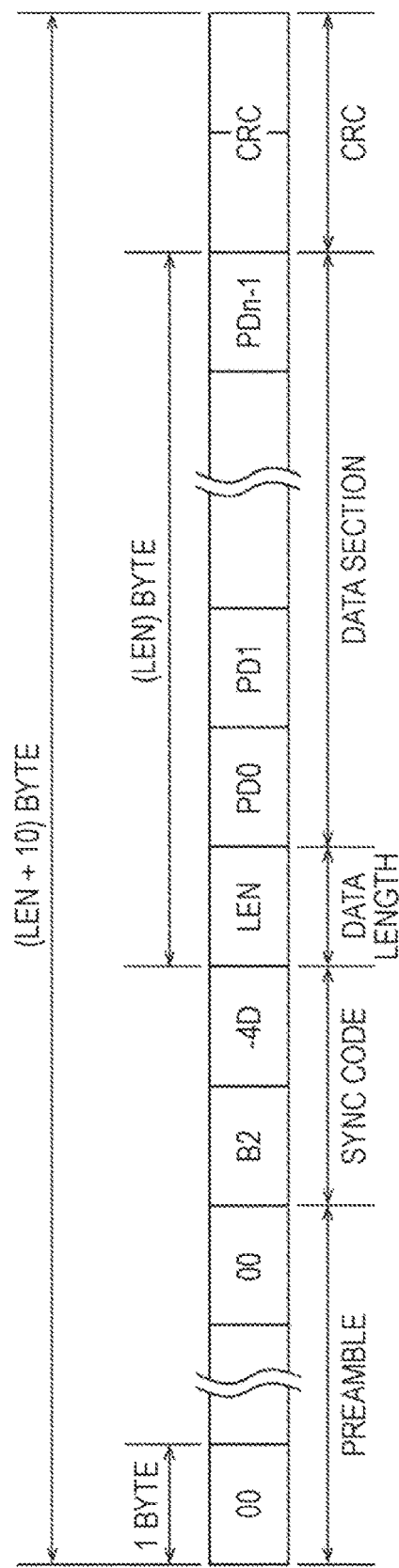
FIG. 2 illustrates a data structure of packet data used in a type C communication method.

FIG. 2 illustrates a data structure of packet data which are transmitted and received between the reader/writer and the IC card in the type C communication method.

As illustrated in FIG. 2, the packet data includes a preamble of 6-byte long at the head of the packet, followed by a 2-byte sync code, a data length representing the number of bytes of data section, a data section storing a command, and a 2-byte parity which is an error correction code for detecting an error (cyclic redundancy check: CRC).

To distinguish the command signal from the reader/writer to the IC card from the response signal from the IC card to the reader/writer, a value of "PD0", for example, which is the first byte of the data section, is used. Specifically, the value of the first byte "PD0" is supposed to be an even number in the command packet from the reader/writer to the IC card, and the value of the first byte "PD0" is supposed to be an odd number in the response packet from the IC card to the reader/writer.

As described above, the type C communication method is a symmetrical communication having such a characteristic that the modulation method and the encoding method are the same in transmission from the reader/writer to the IC card and from the IC card to the reader/writer, and that the only difference between the command packet and the response packet is a value of a partial packet data.

Using the type C communication method having such a characteristic, the IC card, which usually operates as a passive side for making a response to the command that has been sent, can easily operate as an active side for sending the command.

<2. Non-Contact Communication System>

Figure 3:
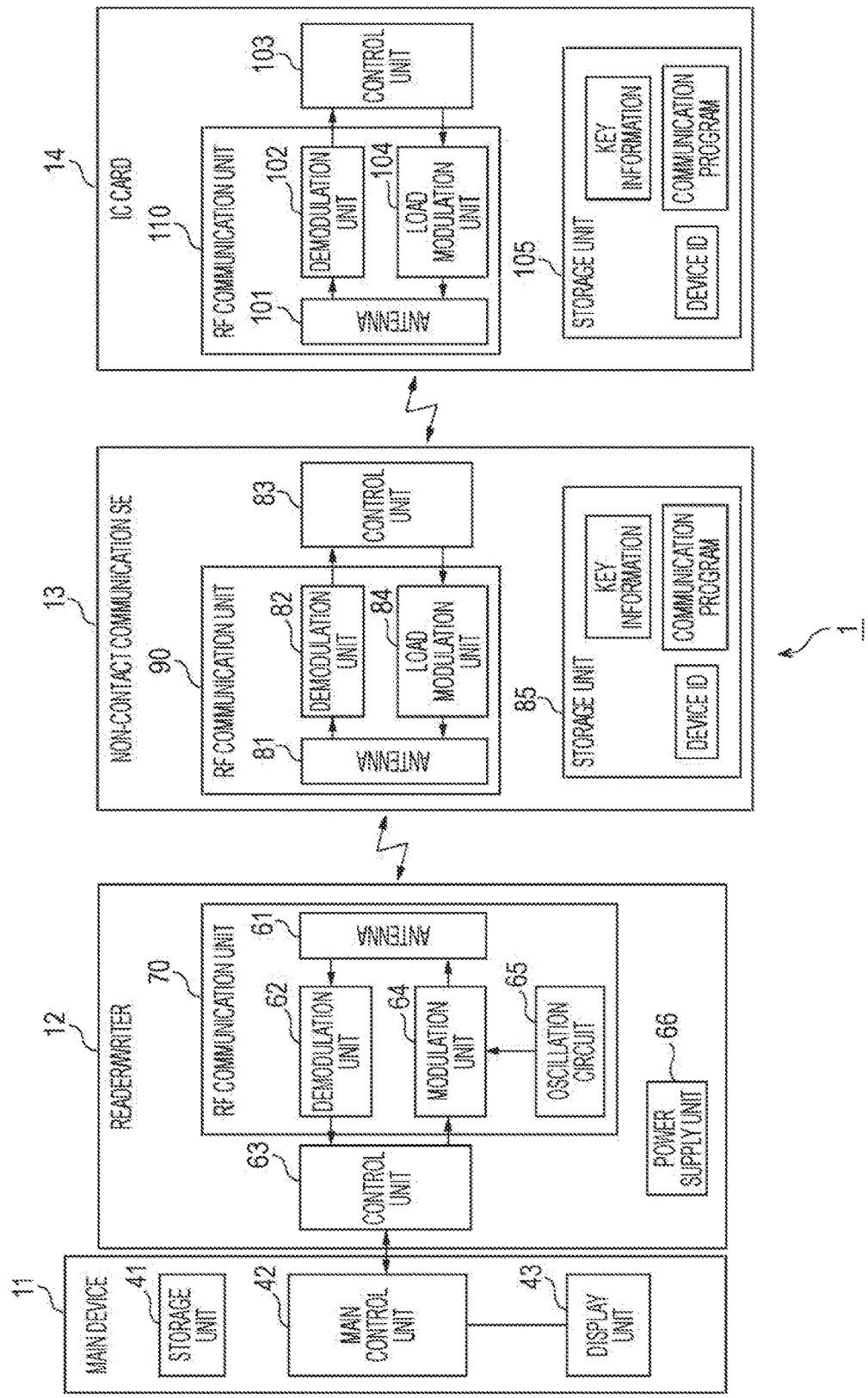
FIG. 3 is a block diagram illustrating an example configuration of a communication system according to an embodiment of the present technology.

FIG. 3 is a block diagram of a non-contact communication system according to an embodiment of the present technology, and illustrates an example communication system of near-field non-contact communication using the type C communication method which is a symmetrical communication.

The communication system 1 of FIG. 3 includes a reader/writer 12 connected to a main device 11, and a non-contact communication SE 13 and an IC card 14, both of which carrying out communication in a range of an electromagnetic wave (carrier wave) generated by the reader/writer 12.

It is noted that the reader/writer 12 may be externally connected to the main device 11 as illustrated in FIG. 3, or incorporated in the main device 11 as a part of the main device 11.

The main device 11 starts a predetermined application in a case where the reader/writer 12 carries out non-contact communication with another non-contact communication device (e.g., the non-contact communication SE 13), and receives an input of information necessary for the non-contact communication or displays a result of the communication.

The main device 11 includes a storage unit 41, a main control unit 42, a display unit 43, and so on. The storage unit 41 is formed of a non-volatile memory, such as a flash memory or an electrically erasable and programmable read only memory (EEPROM). The main control unit 42 is formed of an arithmetic processing unit, such as a micro processing unit (MPU) or a central processing unit (CPU). The display unit 43 is formed of, for example, a liquid crystal display (LCD).

The storage unit 41 stores an application (hereinafter referred to as an RW application) corresponding to non-contact communication of the reader/writer 12, and supplies the application to the main control unit 42 as needed. The main control unit 42 controls the entire main device 11. For example, the main control unit 42 reads and executes an RW application stored in the storage unit 41 when the reader/writer 12 operates. The RW application executed by the main control unit 42 enables sending and receiving of data to and from (the control unit 63 of) the reader/writer 12, and causes the display unit 43 to display the result of acquisition from the reader/writer 12.

The reader/writer 12 includes an antenna 61, a demodulation unit 62, a control unit 63, a modulation unit 64, an oscillation circuit 65, and a power supply unit 66. The antenna 61, the demodulation unit 62, the modulation unit 64, and the oscillation circuit 65 form an RF communication unit 70.

The antenna 61 is formed of, for example, a loop antenna and sends a modulation or non-modulation signal supplied from the modulation unit 64 on an electromagnetic wave. In addition, the antenna 61 receives a modulation signal on the electromagnetic wave sent from another non-contact communication device, and supplies the received modulation signal to the demodulation unit 62.

The demodulation unit 62 demodulates the modulation signal supplied from the antenna 61 by the demodulation method corresponding to the modulation method of a load modulation unit 84 of the non-contact communication SE 13, and supplies data resulted from the demodulation to the control unit 63. For example, the demodulation unit 62 demodulates an amplitude-shift-keying (ASK) modulation signal acquired via the antenna 61 and outputs data obtained by the demodulation to the control unit 63.

The control unit 63 encodes data, such as a predetermined command, by a predetermined method in accordance with an operation instruction supplied from the main control unit 42 of the main device 11, and outputs encoded data to the modulation unit 64. In addition, the control unit 63 decodes the data supplied from the demodulation unit 62 by the method corresponding to the encoding method of the data, and supplies the decoded data to the main control unit 42 of the main device 11.

For example, in a case where data, such as a command, to be sent to another non-contact communication device (e.g., the non-contact communication SE 13) is supplied from the main control unit 42, the control unit 63 carries out encoding processing, such as encoding to Manchester code, on the data and outputs the obtained Manchester code to the modulation unit 64. In addition, the control unit 63 carries out, for example, decoding processing, such as decoding of the Manchester code, on the output from the demodulation unit 62, and supplies the obtained data to the main control unit 42.

The modulation unit 64 modulates a carrier wave supplied from the oscillation circuit 65 by the predetermined method using the data, such as the command supplied from the control unit 63, and supplies the obtained modulation signal to the antenna 61. For example, the modulation unit 64 carries out the ASK modulation of the carrier wave on the basis of the data supplied from the control unit 63.

More specifically, the modulation unit 64, for example, uses a sinusoidal wave having a predetermined frequency supplied from the oscillation circuit 65 as the carrier wave to carry out the ASK modulation of the carrier wave with the data supplied from the control unit 63, and outputs the obtained modulation wave as the electromagnetic wave from the antenna 61.

The oscillation circuit 65 generates the carrier wave having a predetermined frequency, and supplies the generated carrier wave to the modulation unit 64.

The power supply unit 66 includes, for example, a battery and the like to supply necessary power to each element of the reader/writer 12. It is noted that the power supply unit 66 may be configured to receive supply of power from the main device 11 to supply necessary power to each element of the reader/writer 12.

The non-contact communication SE 13 is a secure IC chip (secure element) having a tamper resistant characteristic, and carries out non-contact communication with both the reader/writer 12 and the IC card 14.

The non-contact communication SE 13 includes an antenna 81, a demodulation unit 82, a control unit 83, a load modulation unit 84, and a storage unit 85. The antenna 81, the demodulation unit 82, and the load modulation unit 84 form an RF communication unit 90.

The non-contact communication SE 13 does not include a power supply such as a battery, but is operable by generating direct current power on the basis of alternate-current electromotive force generated in the antenna 81, and supplying the generated direct current power to each element of the non-contact communication SE 13.

The antenna 81 is formed of, for example, a loop antenna to receive the modulation signal sent from another non-contact communication device (e.g., the reader/writer 12 or the IC card 14) and supply the modulation signal to the demodulation unit 82.

The demodulation unit 82 demodulates the modulation signal supplied from the antenna 81 by the demodulation method corresponding to the modulation method of the reader/writer 12 and the IC card 14, and supplies the data obtained as a result of the demodulation to the control unit 83. For example, the demodulation unit 82 demodulates the ASK modulation signal received via the antenna 81, and outputs the data obtained by the demodulation to the control unit 83.

The control unit 83 controls the non-contact communication with the reader/writer 12 and the IC card 14 in accordance with a communication program read from the storage unit 85. Specifically, the control unit 83 decodes the data (including command) supplied from the demodulation unit 82 by a predetermined method, and executes predetermined processing on the basis of the decoded data. In addition, the control unit 83 also encodes, in accordance with the processing result, the data to be sent to the reader/writer 12 or the IC card 14 by the predetermined encoding method, and supplies the encoded data to the load modulation unit 84.

The encoding method, such as Manchester encoding method which is also used in the reader/writer 12 is used herein.

The load modulation unit 84 changes impedance of the antenna 81, when seen from outside, in accordance with the data supplied from the control unit 83. In a case where the RF field (magnetic field) is established around the antenna 81 by the electromagnetic wave output, as the carrier wave, from another non-contact communication device, the impedance of the coil which is seen as the antenna 81 changes and the radio frequency (RF) field around the antenna 81 changes correspondingly. Thus, the carrier wave output as the electromagnetic wave from another non-contact communication device is modulated (load modulation) in accordance with the data supplied from the control unit 83, so that another non-contact communication device (e.g., the reader/writer 12 or the IC card 14) can receive the modulation signal.

The storage unit 85 stores encrypted key information necessary to carry out secure communication with the IC card 14 and device identification (ID) which is identification information to uniquely identify the device. In addition, the storage unit 85 stores the communication program to carry out near-field non-contact communication with the reader/writer 12 and the IC card 14, and supplies the communication program to the control unit 83 as needed. The communication program includes mutual authentication algorithm, decryption algorithm, and so on.

The control unit 83 is formed of an arithmetic processing unit, such as a micro processing unit (MPU) or a central processing unit (CPU). The storage unit 85 is formed of a non-volatile memory, such as a flash memory or an electrically erasable and programmable read only memory (EEPROM).

The IC card 14 has a tamper resistant characteristic and carries out non-contact communication with the non-contact communication SE 13.

The IC card 14 includes an antenna 101, a demodulation unit 102, a control unit 103, a load modulation unit 104, and a storage unit 105. The antenna 101, the demodulation unit 102, and the load modulation unit 104 form an RF communication unit 110.

The antenna 101 operates similarly to the antenna 81 of the non-contact communication SE 13. The demodulation unit 102 operates similarly to the demodulation unit 82 of the non-contact communication SE 13. The control unit 103 operates similarly to the control unit 83 of the non-contact communication SE 13. The load modulation unit 104 operates similarly to the load modulation unit 84 of the non-contact communication SE 13. The storage unit 105 operates similarly to the storage unit 85 of the non-contact communication SE 13. Thus, the non-contact communication SE 13 and the IC card 14 have the same hardware configuration.

The non-contact communication SE 13 may be provided in the shape of a chip or an IC card. In addition, two IC cards capable of executing non-contact communication can be used, one card as the non-contact communication SE 13 and the other card as the IC card 14.

It is noted that, in the present embodiment, each device of the communication system 1 carries out near-field non-contact communication using the type C communication method, which is described by referring to FIG. 1, so that the ASK 10% modulation and Manchester encoding are used, respectively, as the modulation method and the encoding method. However, the modulation method and the encoding method are not limited to these methods, because it is only required that each element of the communication system 1 carries out symmetric communication. For example, the modulation may be executed by phase shift keying (PSK), quadrature amplitude modulation (QAM), or the like, while the encoding may be executed using Miller, NRZ-L, or the like.

In the communication system 1 having the configuration described above, the reader/writer 12 is an active side device that outputs the electromagnetic wave from the reader/writer 12, and modulates the electromagnetic wave to send the command to another non-contact communication device. Meanwhile, the non-contact communication SE 13 and the IC card 14 are passive side devices that carry out load modulation of the electromagnetic wave output from another non-contact communication device (reader/writer 12) and make a response to the command.

Thus, the non-contact communication SE 13 cannot operate in itself as the active side, but can come to operate as the active side according to the following procedure using the fact that the type C communication method described by referring to FIG. 1 is the symmetrical communication.

As described by referring to FIG. 2, the type C communication method distinguishes a command packet from a response packet using, for example, a value of the packet data at a predetermined position. For example, the packet is regarded as a command packet if the value of the first byte "PD0" is an even number, while the packet is regarded as a response packet if the value of the first byte "PD0" is an odd number. Accordingly, the non-contact communication SE 13 can send a command by sending the packet having the even number in the first byte "PD0", so that the non-contact communication SE 13 can operate as the active side.

Figure 4:
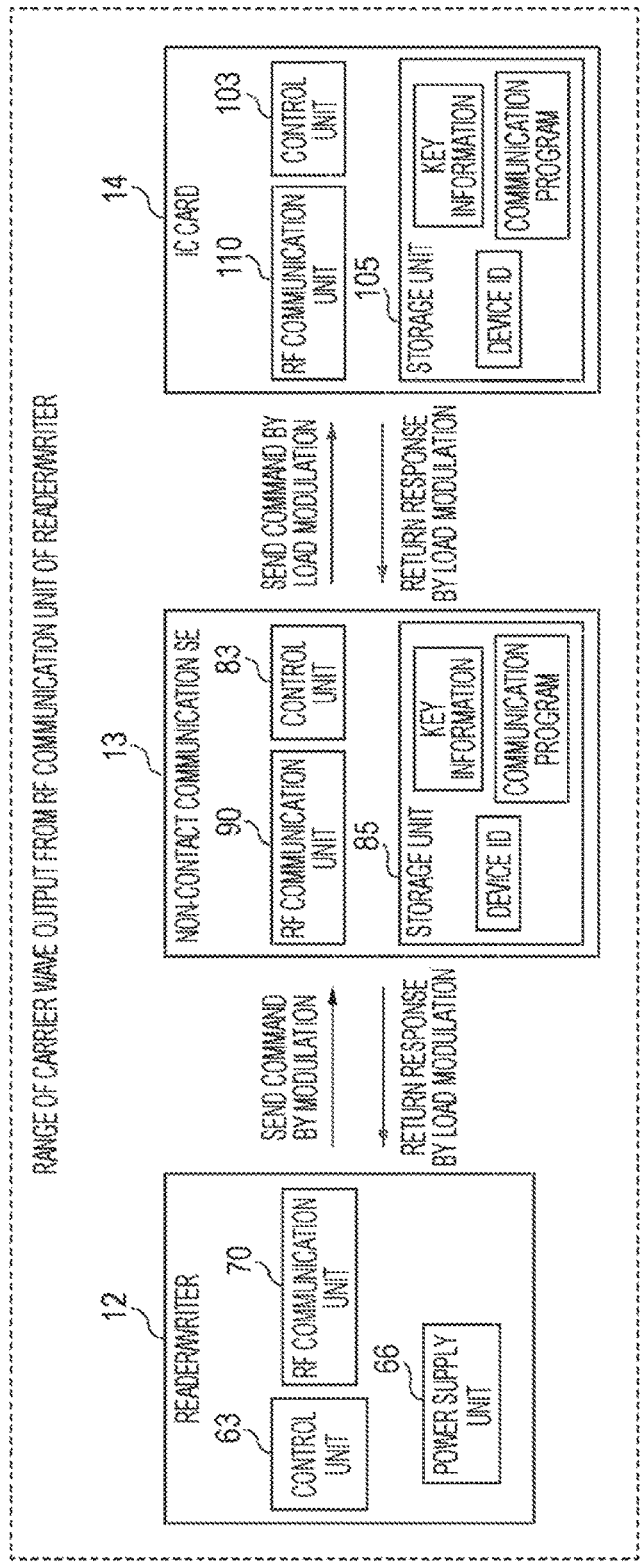
FIG. 4 is a diagram for explaining communication in a communication system.

Namely, as illustrated in FIG. 4, in a case where the non-contact communication SE 13 and the IC card 14 are present in a range of the carrier wave (electromagnetic wave) output from the RF communication unit 70 of the reader/writer 12, the non-contact communication SE 13 operates as the passive side toward the reader/writer 12, but operates as the active side toward the IC card 14.

More specifically, in a case of carrying out the non-contact communication with the reader/writer 12, the non-contact communication SE 13 receives the command sent from the reader/writer 12 by modulating the carrier wave by the reader/writer 12, and returns a response (response command) to the reader/writer 12 by carrying out the load modulation of the carrier wave output from the RF communication unit 70 of the reader/writer 12.

Meanwhile, in a case of carrying out the non-contact communication with the IC card 14, the non-contact communication SE 13 sends the command to the IC card 14 by carrying out the load modulation of the carrier wave output from the RF communication unit 70 of the reader/writer 12, and receives a response (response command) sent from the IC card 14 by carrying out the load modulation of the carrier wave output from the RF communication unit 70 of the reader/writer 12 by the IC card 14.

However, there is a risk of interference in a case where both the non-contact communication SE 13 and the IC card 14 are present as the passive side in the range of the carrier wave output from the RF communication unit 70 of the reader/writer 12. Specifically, it might happen that the IC card 14 would send a response to the command sent from the reader/writer 12, or the reader/writer 12 would receive the response sent to the non-contact communication SE 13 from the IC card 14.

Figure 5:
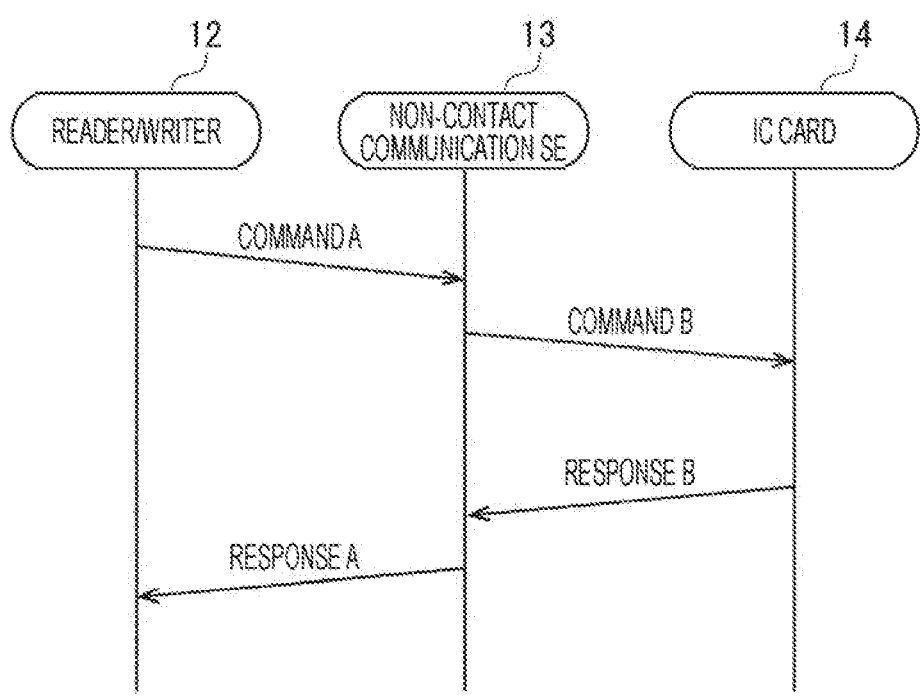
FIG. 5 is a diagram for explaining how to prevent interference in a communication system.

The communication system 1, therefore, prevents the interference using different command sets in the communication between the reader/writer 12 and the non-contact communication SE 13 and in the communication between the non-contact communication SE 13 and the IC card 14, as illustrated in FIG. 5.

Specifically, a command set A (command A and response A) is used in the communication between the reader/writer 12 and the non-contact communication SE 13, and a command set B (command B and response B) is used in the communication between the non-contact communication SE 13 and the IC card 14.

As a result, the IC card 14 does not respond to the command A, even though received, by judging that the command A is not destined to the IC card 14. In addition, the reader/writer 12 does not process the response B, even though received, by judging that the response B is not destined to the reader/writer 12. Thus, the interference is prevented.

The command set for the higher-side non-contact communication between the non-contact communication SE 13 and the reader/writer 12 can be distinguished from the command set for the lower-side non-contact communication between the non-contact communication SE 13 and the IC card 14 by the value of the first byte of the packet, similarly to the distinguishing between the command packet and the response packet mentioned above. More specifically, the command set A may use, for example, values from "0" to "9" for the first byte "PD0", while the values from "10" to "19" are used for the first byte "PD0" of the command set B. Thus, the command sets can be distinguished from each other. Further, among the values from "0" to "9" used in the first byte "PD0" of the command set A, the even numbers are classified as the command packet and the odd numbers are classified as the response packet.

Alternatively, the values of the first byte "PD0" may be used for distinguishing between the command packet and the response packet, and the values of the second byte "PD1" may be used for distinguishing between the command sets. For example, it is possible to distinguish between the command sets in such a manner that the command set A is determined when the value of the second byte "PD1" is an even number, and the command set B is determined when the value of the second byte "PD1" is an odd number.

Alternatively, the command sets for the higher-side non-contact communication and the lower-side non-contact communication may be distinguished from each other according to a value of a predetermined position other than the data section. For example, a different sync code may be used for the higher-side non-contact communication and the lower-side non-contact communication to distinguish between the command sets for the higher-side non-contact communication and the command set for the lower-side non-contact communication.

As described above, the non-contact communication SE 13 operating as the passive side toward the reader/writer 12 can operate as the active side toward the IC card 14 by utilizing the characteristic of the symmetrical communication in which the data of the packet data located at the predetermined position is used as the identification information to distinguish between the higher-side non-contact communication and the lower-side non-contact communication.

Namely, the communication system 1 of FIG. 3 can achieve a simpler configuration to implement the active side function.

<3. Example of Use of Application>
<Example of Use in Electronic Money Settlement>

In the following, an example of use of an application in the communication system 1 is described. It is noted that the example of use of the application is described by referring to the elements of the reader/writer 12, the non-contact communication SE 13, and the IC card 14, which are illustrated in FIG. 3, as appropriate.

Figure 6:
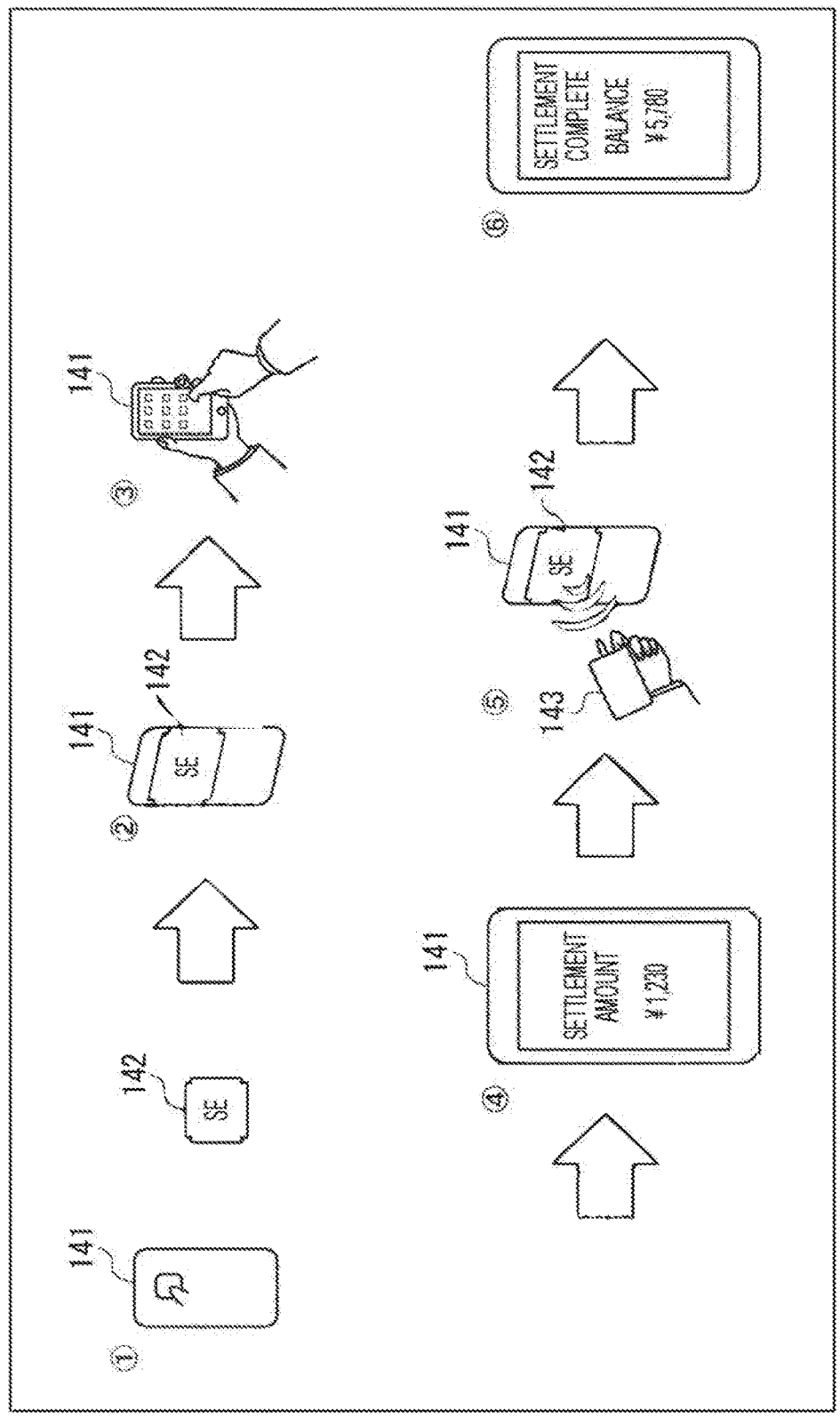
FIG. 6 illustrates an outline of an electronic money settlement processing.

First, an example of use in electronic money settlement processing is described by referring to FIGS. 6 and 7.

FIG. 6 illustrates an outline of electronic money settlement processing.

For example, a retail store uses a smartphone (personal digital assistant) 141 as the main device 11 incorporating the reader/writer 12, and a smartphone jacket 142 as the non-contact communication SE 13.

In a case where a clerk of the retail store tries to collect payment of an item purchased by a user (customer) with an electronic money card 143 of the user, the clerk first puts the smartphone jacket 142 on the smartphone 141.

Once the smartphone jacket 142 is put on the smartphone 141, the smartphone jacket 142 comes to enter the range of a magnetic field (carrier wave) generated by the reader/writer 12, so that the reader/writer 12 in the smartphone 141 can detect the RF communication unit 90 of the smartphone jacket 142, and start an electronic settlement application on the smartphone 141.

In the started electronic settlement application, the clerk inputs an amount of money, or an amount of the purchased article, to be withdrawn from the electronic money card 143 of the user. FIG. 6 illustrates a state where the clerk has input JPY1,230 as the amount of money (settlement amount) to be withdrawn from the electronic money card 143 of the user.

After inputting the settlement amount in the electronic settlement application, the user holds the electronic money card 143 owned by the user over (or closer to) the smartphone 141 with the smartphone jacket 142 put thereon. The electronic money card 143 corresponds to the IC card 14 of the communication system 1.

When the electronic money card 143 comes into the range of the magnetic field (carrier wave) generated by the reader/writer 12, the smartphone jacket 142, which acts as the non-contact communication SE 13, carries out the load modulation of the carrier wave generated by the reader/writer 12, and sends the command to the electronic money card 143 to execute the settlement processing.

Upon completion of the settlement processing, the display unit 43 of the smartphone 141 displays the processing result. For example, the balance amount (JPY5,780) is displayed on the electronic money card 143 after the settlement processing.

Referring to a flowchart of FIG. 7, the electronic money settlement processing, which has been described by referring to FIG. 6, is described more in detail.

First, in step S11, the RF communication unit 70 of the reader/writer 12 incorporated in the smartphone 141 sends a polling command at predetermined time intervals.

When the smartphone jacket 142 is put on the smartphone 141 and the smartphone jacket 142 enters the range of the magnetic field (carrier wave) generated by the reader/writer 12, the RF communication unit 90 of the smartphone jacket 142 receives the polling command, and returns, as a response, a device ID that identifies the smartphone jacket 142 as the non-contact communication SE 13 to the reader/writer 12 in step S12.

Upon reception of the device ID sent from the smartphone jacket 142, the RF communication unit 70 of the reader/writer 12 supplies the received device ID to the main control unit 42 in the smartphone 141 in step S13.

In step S14, the main control unit 42 of the smartphone 141 receives the device ID and starts an electronic settlement application as the application corresponding to the device ID.

In step S15, the started electronic settlement application sends an SE request command to confirm whether the non-contact communication SE 13 can correspond to the electronic settlement processing to the reader/writer 12. The SE request command is a command for confirming whether the non-contact communication SE 13 is a non-contact communication device that carries out prescribed processing. It is also possible to add information indicating validity of the electronic settlement application to the SE request command by the non-contact communication SE13.

In step S16, the reader/writer 12 obtains the SE request command and sends the obtained SE request command further to the smartphone jacket 142.

The smartphone jacket 142, which acts as the non-contact communication SE 13, receives the SE request command from the reader/writer 12, and returns a response (SE request response) corresponding to the SE request command to the reader/writer 12 in step S17.

The reader/writer 12 receives the SE request response from the smartphone jacket 142, and then returns the received SE request response to the electronic settlement application (main control unit 42) of the smartphone 141 in step S18.

The SE request response may be any data, such as fixed data predetermined for the electronic settlement application, so long as the electronic settlement application can determine with such data that the non-contact communication SE 13 corresponds to the electronic settlement processing of the application. In addition, the SE request response may be, for example, the device ID or the like that identifies the smartphone jacket 142 as the non-contact communication SE 13.

In step S19, when the validity of the smartphone jacket 142 is determined in accordance with the received SE request response, the electronic settlement application displays a settlement amount input screen to allow the clerk to input the settlement amount in step S19.

Upon input of the settlement amount by the clerk, the electronic settlement application sends the input settlement amount and a transaction request command that requires withdrawal processing to withdraw the settlement amount from the electronic money card 143 to the reader/writer 12 in step S20.

In step S21, the reader/writer 12 obtains the transaction request command and further sends the transaction request command to the smartphone jacket 142.

In step S22, the RF communication unit 90 of the smartphone jacket 142, when having received the settlement amount and the transaction request command, carries out load modulation of the carrier wave generated from the reader/writer 12 of the smartphone 141 to send a polling command. It is noted that, as described above, different command sets are used for the non-contact communication with the reader/writer 12 of the smartphone 141 and the non-contact communication with the electronic money card 143 to prevent interference. In addition, the specification of the command set of the existing card can be used as it is for the command set of the communication with the electronic money card 143.

In step S23, the RF communication unit 110 of the electronic money card 143 receives the polling command from the RF communication unit 90 of the smartphone jacket 142 and returns the device ID, as a response, that identifies the electronic money card 143 to the smartphone jacket 142.

Next, the smartphone jacket 142 and the electronic money card 143 authenticate each other using a predetermined mutual authentication algorithm, such as challenge and response authentication. Namely, in step S24, the RF communication unit 90 of the smartphone jacket 142 sends a mutual authentication command (challenge word) to the electronic money card 143, and the RF communication unit 110 of the electronic money card 143 generates a mutual authentication response to send the mutual authentication response to the smartphone jacket 142, thus executing the mutual authentication in step S25.

Upon completion of the mutual authentication, the settlement processing for withdrawing the settlement amount from the amount of electronic money stored in the electronic money card 143 using encrypted communication is carried out between the smartphone jacket 142 and the electronic money card 143. Specifically, in step S26, the RF communication unit 90 of the smartphone jacket 142 sends an encrypted communication command to withdraw the settlement amount to the electronic money card 143. In step S27, the control unit 103 of the electronic money card 143 executes processing for withdrawing the settlement amount sent from the smartphone jacket 142 from the amount of electronic money stored in the storage unit 105. After that, the RF communication unit 110 sends the execution result of the withdrawal processing to the smartphone jacket 142 as an encrypted communication response. For example, the RF communication unit 110 sends, as the execution result of the withdrawal processing, the execution result indicating both normal completion of the withdrawal processing and the balance amount of electronic money in the electronic money card 143, from the electronic money card 143 to the smartphone jacket 142.

In step S28, the smartphone jacket 142, when having received the execution result of the withdrawal processing, sends a transaction request response to the reader/writer 12 as a response to the transaction request command received in step S21.

In step S29, the reader/writer 12 receives the transaction request response from the smartphone jacket 142 and further supplies the transaction request response to the electronic settlement application.

In step S30, the electronic settlement application obtains the transaction request response from the reader/writer 12, and displays the fact that the electronic settlement processing is normally completed together with the balance amount of the electronic money in the electronic money card 143 on the display.

Thus, the electronic money settlement processing is executed among three elements, i.e., the smartphone 141 including the reader/writer 12, the smartphone jacket 142, and the electronic money card 143.

In the non-contact communication between the reader/writer 12 of the smartphone 141 and the smartphone jacket 142, the command set A, for example, is used so that the reader/writer 12 operates as the active side and the smartphone jacket 142 operates as the passive side. Meanwhile, in the non-contact communication between the smartphone jacket 142 and the electronic money card 143, the smartphone jacket 142 operates as the active side and the electronic money card 143 operates as the passive side by carrying out the load modulation of the carrier wave generated by the reader/writer 12 and using the command set B which is different from the command set A.

It is noted that, in the electronic money settlement processing described above, the start of the electronic settlement application is triggered by the fact that the smartphone jacket 142 is put on the smartphone 141. However, the above starting method of the electronic settlement application is only an example and the electronic settlement application may be started by a different method. For example, the electronic settlement application can be started manually by the user by designating the application, or by clicking the link or reading two-dimensional code on the website. After the start of the application, the processing described above is similarly carried out.

FIG. 8 illustrates typical classifications of a reader/writer terminal that carries out settlement processing of the electronic money card using non-contact communication.

The reader/writer terminals that carry out the settlement processing of the electronic money card using the non-contact communication are generally classified into two types, one is a multifunctional dedicated terminal that carries out offline settlement, and a thin client terminal that carries out online settlement.

The multifunctional dedicated terminal is advantageous in that the settlement can be done offline that does not require network connection, such as the Internet, so that the processing speed is fast. In addition, the multifunctional characteristic enables the use in various situations (less situational restrictions). Further, transaction logs (transaction record) are uploaded to the server using a batch process, so that only simple and easy processing is necessary on the server side.

Meanwhile, the multifunctional dedicated terminal is disadvantageous as being necessary to have various functions and high security, leading to the cost increase. Further, it is difficult to add new functions to the terminal.

In contrast, a thin client terminal is advantageous in that all functions related to settlement are carried out on the server side and the terminal can mainly have a communication function, so that the terminal can be a versatile and low cost terminal. Further, adding a new function, if desired, is easy, as it can be carried out on the server side.

Meanwhile, the thin client terminal is disadvantageous in that the terminal needs to be connected to the server every time the settlement processing is carried out, so that the processing speed is unstable as being susceptible to the communication state. Further, the thin client terminal can be used in limited situations, because the terminal cannot be used in a situation where no network connection is established. Real time communication with the server is necessary, so that the processing on the server side becomes complicated.

When the present method using the communication system 1 is compared to the above-described two types of classifications, the reader/writer 12 needs to have the function of outputting the electromagnetic wave (carrier wave), and the function of sending and receiving non-secure information, so that the reader/writer 12 can be implemented as a versatile terminal. In addition, the settlement can be carried out offline, as there is no need to connect to the network during settlement.

When the electronic settlement application of the smartphone 141 issues a transaction request command, the electronic settlement processing is carried out between the smartphone jacket 142, which acts as the non-contact communication SE 13, and the electronic money card 143 as the IC card 14. The processing speed is fast, similarly to the multifunctional dedicated terminal, due to the offline settlement, and can be used in various situations. Further, the transaction logs are uploaded to the server in the batch process using the network, such as the Internet, via a portable telephone communication network or a wireless local area network (LAN), so that the only simple and easy processing can be necessary on the server side, and allowing the same server as the server for the multifunctional dedicated terminal to be used (appropriated).

In addition, the versatile personal digital assistant, such as a smartphone or a tablet having a near-field-type non-contact communication function, can be used as the main device 11, so that the cost of the terminal can be decreased correspondingly.

With respect to the addition of the new function, the new function can be added or changed to application software that operates in the versatile personal digital assistant, such as a smartphone or a tablet, so that addition or update of the new function is easy, and the customization is easy.

In addition, in a case where it is desired to update the information stored in the non-contact communication SE 13, such as the addition of the settlement service or a change of key information, the main device 11 can easily be disconnected, so that the update by replacement is also easy.

As described above, the present method using the communication system 1 has a characteristic combining the advantages of both the multifunctional dedicated terminal and the thin client terminal.

Further, the non-contact communication SE 13 and the IC card 14 can exchange secure information directly via the secure non-contact communication safely and quickly.

<Example of Use in Hotel Guest Room Key>

Next, a case where the communication system 1 according to the present technology is used in a door locking mechanism for locking guest rooms in a hotel is described.

Recent hotels often use IC cards as door keys for locking and unlocking the doors of guest rooms. In a typical door locking mechanism using IC cards as door keys, a reader/writer that stores key information (secure information) in an SE chip is provided inside the door lock portion of the guest room. In case of exchanging the door key for individual users or replacing the door key due to the loss or the like in such a door locking mechanism, it is necessary to change key information (secure information) stored in the SE chip inside the door lock portion of the guest room using a dedicated key information change device.

In a care where the communication system 1 is used in such a door locking mechanism for locking the guest room of the hotel, the reader/writer 12 and the non-contact communication SE 13 are provided at the door lock portion of the guest room. However, the non-contact communication SE 13 can be provided in an easily removable manner, such as by being inserted into to position near the reader/writer 12. Then, the IC card 14 is lent to a user who uses the guest room of the hotel as a door key.

In a case where the need for replacement of the door key happens, the key information can be change only by exchanging the non-contact communication SE 13 provided at the door lock portion of the guest room. Thus, the key information can be changed easily. In addition, the same reader/writer 12 can be provided at the door lock portion of all guest rooms, allowing the use of a versatile reader/writer module that does not have a secure function, thus decreasing the cost of the reader/writer 12.

The process flow of the non-contact communication in a case where the communication system 1 is used in the door locking mechanism can be carried out substantially similarly to the processing described by referring to FIG. 7. However, the system of the door locking mechanism does not include a device equivalent to the main device 11, so that the correspondence between the main control unit 42 of the smartphone 141 and the reader/writer 12 is unnecessary. In addition, the non-contact communication SE 13 is always detected as being provided constantly in the output range of the carrier wave of the reader/writer 12.

Then, the non-contact communication SE 13 of the door lock portion of the guest room regularly confirms whether the IC card 14, which acts as the door key, is present in accordance with the received transaction request command in step S22. In a case where the IC card 14 is detected, the non-contact communication SE 13 executes authentication processing or the like with the IC card 14 to confirm whether the user possessing the IC card 14 is a valid user of the guest room. In step S28, then, the non-contact communication SE 13 returns the confirmation result to the reader/writer 12 as the transaction request response.

The reader/writer 12 controls the door key of the guest room to be unlocked in a case where it is confirmed that the user is a valid user of the guest room in accordance with the received transaction request response.

The door lock mechanism control as described above can similarly be used in, for example, lockers for members of a sports club.

<Example of Use in Attendance Check System>

The present technology can also be used in a system for confirmation/authentication of attendance to in-house meetings or classes at university by checking IC cards used as employee cards or student identification cards. In such a system, a reader/writer is typically connected to a company database in which employee information is registered or a school database in which student information is registered, so that checking processing to check the information read by the IC card against the database is carried out.

In contrast, in a case where the communication system 1 is used in the attendance checking system, a personal computer, for example, in which a versatile reader/writer is incorporated can be used as the main device 11 and the reader/writer 12. Alternatively, a reader/writer having a USB connection may be connected externally to a personal computer that does not have a versatile reader/writer. In any case, the versatile reader/writer can be used as the reader/writer 12. As the non-contact communication SE 13, the IC card storing, for example, student or employee data, or participants information of a meeting or a class as the secure information may be used.

The process flow of the checking system to confirm/authenticate attendance of the employees to the in-house meeting can be carried out similarly to the electronic money settlement processing described by referring to FIG. 7.

Specifically, the non-contact communication SE 13 and the IC card 14, which is an employee identification card of an employee who attends the in-house meeting, are held over in the output range of the carrier wave of the reader/writer 12 of the personal computer. When the reader/writer 12 notifies the CPU of the personal computer, which acts as the main control unit 42 of the main device 11, of detection of the non-contact communication SE 13, the application software that carries out attendance authentication is started on the personal computer.

In response to the transaction request command from the application software that carries out attendance authentication, the non-contact communication SE 13 and the IC card 14 carry out mutual authentication and confirmation/authentication of the employee information, and return the authentication result to the reader/writer 12 as the transaction request response.

The application software that carries out attendance authentication obtains the authentication result from the reader/writer 12, and displays the authentication result on the display of the personal computer.

According to the above checking system using the communication system 1, the versatile reader/writer that does not have the secure function can be used, so that a high functioning dedicated reader/writer is not necessary. In addition, no connection is necessary with the in-house system or the in-house database in a situation where the attendance of the employees is to be confirmed/authenticated.

According to the communication system 1 described above, the fact that the type C communication method is the symmetrical communication is used to allow the non-contact communication SE 13 operating as the passive side toward the reader/writer 12 to operate as the active side toward the IC card 14.

This eliminates the need for the non-contact communication SE 13 to have an electromagnetic wave output function or a battery, which should have been provided in the non-contact communication device when it operates as the active side, thus achieving a simpler configuration to implement the active side function.

The embodiments of the present disclosure are not limited to the embodiments described above, and various changes may be made in a range without departing from the spirit of the present technology.

For example, all or a part of the embodiments described above may be combined and used.

For example, the present technology can adopt a cloud computing configuration in which a single function is processed by a plurality of devices via a network in a distributed and shared manner.

Moreover, the steps described in the above-mentioned flowchart can be executed by a single device or can be executed by a plurality of devices in a distributed manner.

Further, in a case where a single step includes a plurality of processing steps, the plurality of processing steps included in the single step can be executed by a single device or can be executed by a plurality of devices in a distributed manner.

In the present specification, those steps stated in the flowchart are indeed carried out in time series according to the order of steps described. The steps, however, may not always be processed in time series and, instead, may be executed in parallel or at necessary timing, such as in calling order.

In addition, in the present specification, the system refers to a group of constituent components (e.g., device, chip, and module (parts)) and it does not matter whether all constituent components are in the same housing. Therefore, both a plurality of devices accommodated in separate housings and connected via a network and a single device including a plurality of modules accommodated in a single casing are systems.

Moreover, it is noted that the present specification describes only an example effect not in a limiting manner, and an additional effect may also be provided.

It is noted that the present technology may also be provided in the following configuration:

(1)

A non-contact communication device, including a communication unit configured to receive a command from a first device using a carrier wave output from the first device, and send a command to a second device using the carrier wave output from the first device.

(2)

The non-contact communication device as recited in (1) above, in which the communication unit receives a first command from the first device, the first command sent by modulating a carrier wave output from the first device, returns a first response corresponding to the first command to the first device by carrying out load modulation of the carrier wave output from the first device, sends a second command to the second device by carrying out load modulation of the carrier wave output from the first device, and receives a second response corresponding to the second command sent by the second device carrying out load modulation of the carrier wave output from the first device.

(3)

The non-contact communication device as recited in (2) above, in which the first command and the second command have different values of a predetermined byte in packet data.

(4)

The non-contact communication device as recited in (2) or (3) above, in which the first command and the first response have different values of a predetermined byte in packet data.

(5)

The non-contact communication device as recited in (2) or (4) above, in which the first command and the second command have different sync codes in packet data.

(6)

The non-contact communication device as recited in any one of (1) to (5) above, in which the communication unit receives a command from the first device to confirm whether the non-contact communication device carries out prescribed processing, and returns a response to the command.

(7)

The non-contact communication device as recited in any one of (1) to (6) above, in which when the communication unit receives a request for predetermined processing as the command from the first device, the communication unit executes, in response to the request, the predetermined processing with the second device, and returns a response to the request to the first device after the request is executed.

(8)

The non-contact communication device as recited in any one of (1) to (7) above, in which the communication unit carries out communication with the first device and communication with the second device in a symmetrical communication method.

(9)

A non-contact communication method, including receiving, by a non-contact communication device, a command from a first device using a carrier wave output from the first device, and sending, by the non-contact communication device, a command to a second device using the carrier wave output from the first device.

(10)

A program causing a computer to execute non-contact communication processing including receiving a command from a first device using a carrier wave output from the first device, and sending a command to a second device using the carrier wave output from the first device.

(11)

A non-contact communication system, including a reader/writer and a non-contact communication device, the reader/writer outputting a carrier wave to send a command to the non-contact communication device, the non-contact communication device receiving the command from the reader/writer using the carrier wave output from the reader/writer, and sending a command to another non-contact communication device using the carrier wave output from the reader/writer.

REFERENCE SIGNS LIST

1 Communication system
11 Main device
12 Reader/writer
13 Non-contact communication SE
14 IC card
41 Storage unit
42 Main control unit
63 Control unit
70 RF communication unit
83 Control unit
84 Load modulation unit
85 Storage unit
90 RF communication unit
103 Control unit
104 Load modulation unit
105 Storage unit
110 RF communication unit
141 Smartphone
142 Smartphone jacket
143 Electronic money card

The invention claimed is:

1. A non-contact communication device, comprising:
a communication unit configured to:
receive a first command from a first device based on a carrier wave output from the first device; and
transmit a second command to a second device based on the carrier wave, wherein
the first command is different from the second command, and
a first value of a specific byte in packet data for the first command is different from a second value of the specific byte in the packet data for the second command, in a symmetrical communication method.

2. The non-contact communication device according to claim 1,
wherein the first device transmits the first command based on modulation of the carrier wave, and
wherein the communication unit is further configured to:
return a first response to the first device based on load modulation of the carrier wave, wherein the first response corresponds to the first command;
transmit the second command to the second device based on the load modulation of the carrier wave; and
receive a second response corresponding to the second command based on the load modulation of the carrier wave.

3. The non-contact communication device according to claim 2, wherein the first value of the specific byte in the packet data for the first command is different from a third value of the specific byte in the packet data for the first response.

4. The non-contact communication device according to claim 2, wherein a sync code in the packet data for the first command is different from a sync code in the packet data for the second command.

5. The non-contact communication device according to claim 1, wherein the communication unit is further configured to:
 determine an execution state of a specific process of the non-contact communication device; and
 return a response, which corresponds to the first command, to the first device based on the execution state of the specific process.

6. The non-contact communication device according to claim 1, wherein, based on receipt of a request for a specific process from the first device, the communication unit is further configured to:
 execute the specific process with the second device; and
 return a response, which corresponds to the request, to the first device based on execution of the request.

7. The non-contact communication device according to claim 1, wherein the communication unit is further configured to communicate with the first device and the second device in the symmetrical communication method.

8. A non-contact communication method, comprising:
 receiving, by a non-contact communication device, a first command from a first device based on a carrier wave output from the first device; and
 transmitting, by the non-contact communication device, a second command to a second device based on the carrier wave, wherein
 the first command is different from the second command, and
 a value of a specific byte in packet data for the first command is different from a value of the specific byte in the packet data for the second command, in a symmetrical communication method.

9. A non-transitory computer-readable medium having stored thereon, computer-executable instructions, which when executed by a computer, cause the computer to execute operations, the operations comprising:
 receiving a first command from a first device based on a carrier wave output from the first device; and
 transmitting a second command to a second device based on the carrier wave, wherein
 the first command is different from the second command, and
 a value of a specific byte in packet data for the first command is different from a value of the specific byte in the packet data for the second command, in a symmetrical communication method.

10. A non-contact communication system, comprising:
 a reader/writer; and
 a first non-contact communication device,
 wherein the reader/writer is configured to:
  output a carrier wave; and
  transmit a first command to the first non-contact communication device based on the output of the carrier wave, and
 wherein the first non-contact communication device is configured to:
  receive the first command from the reader/writer based on the carrier wave; and
 transmit a second command to a second non-contact communication device based on the carrier wave, wherein
 the first command is different from the second command, and
 a value of a specific byte in packet data for the first command is different from a value of the specific byte in the packet data for the second command, in a symmetrical communication method.

* * * * *